Jan. 3, 1967  T. J. SMITH  3,295,406
COLOR GRADING APPARATUS
Filed Feb. 21, 1963  2 Sheets-Sheet 1
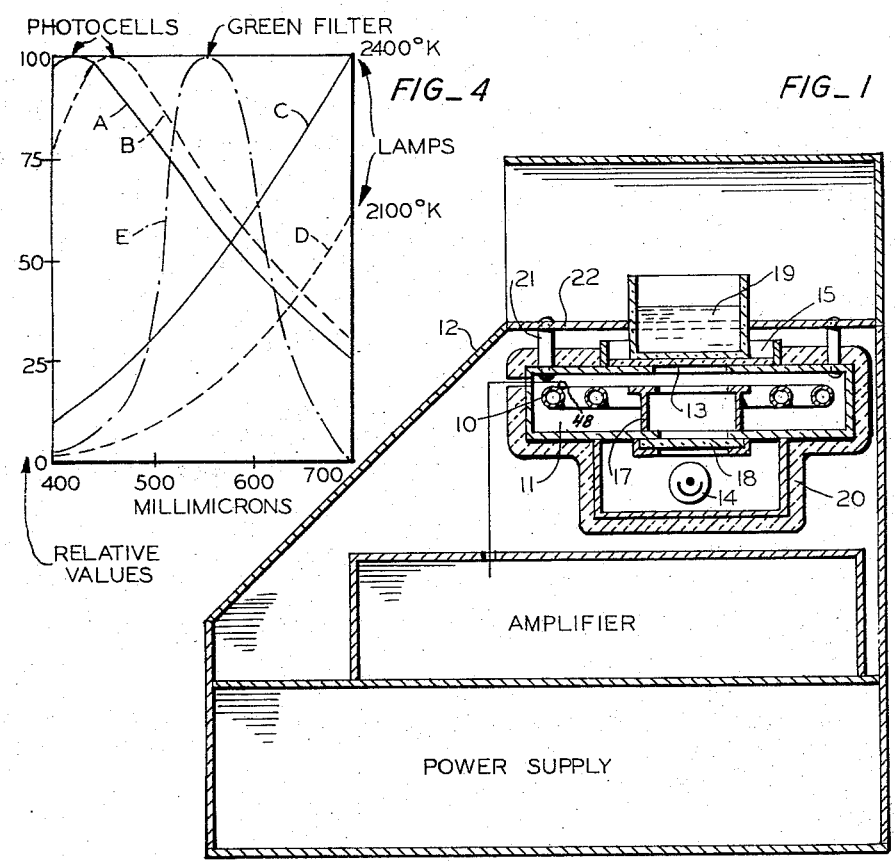
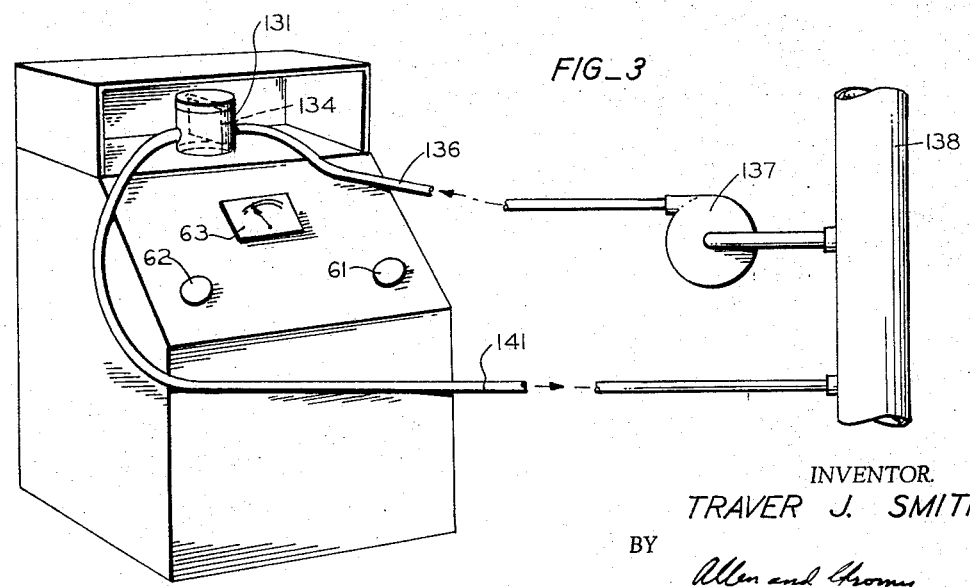
INVENTOR.
TRAVER J. SMITH
BY
*Allen and Chromy*
ATTORNEYS

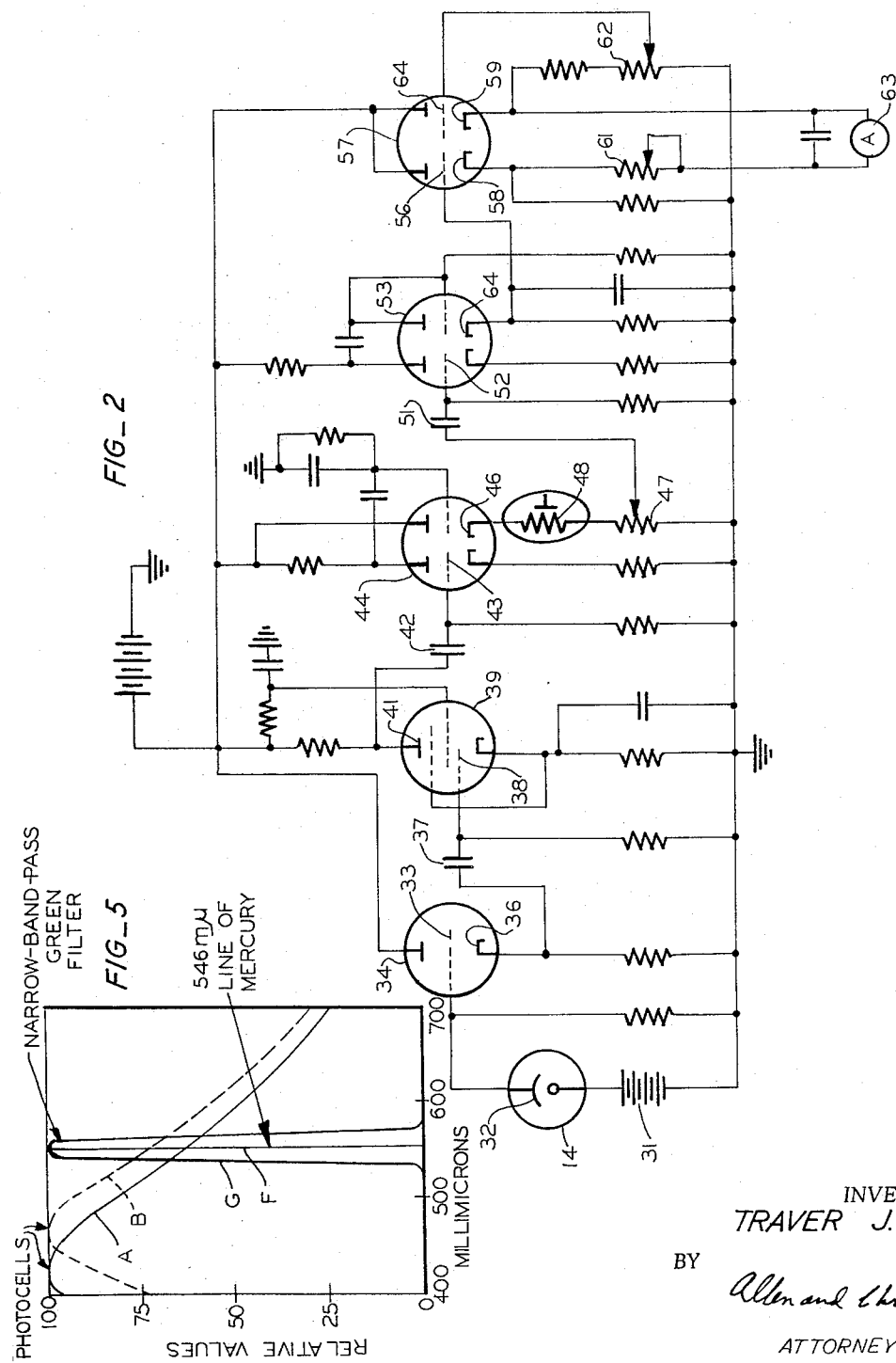

United States Patent Office 3,295,406
Patented Jan. 3, 1967

3,295,406
COLOR GRADING APPARATUS
Traver J. Smith, San Jose, Calif., assignor of one-half to Genevieve I. Magnuson and one-half to Genevieve I. Magnuson, Robert Magnuson and Lois J. Fox, trustees of the estate of Roy M. Magnuson, deceased
Filed Feb. 21, 1963, Ser. No. 260,276
7 Claims. (Cl. 88—14)

This application is a continuation-in-part of my application Serial No. 494,783, now abandoned, for Color Grading, filed March 16, 1955.

The present invention relates to the color grading of products such as food products, and is concerned more particularly with a simplified apparatus whereby commercial grading of various products can be performed with a substantially monochromatic light source as the entire illumination, and whereby the sensitivity of the apparatus can be adjusted to the desired color range of the particular product being graded.

In accordance with prior practice in the color grading of products, such as food products of various characters, it has been customary to use relatively complicated apparatus involving the reading of two to three reflectance measurements in the different color regions of the spectrum and to calculate from these different readings a final one, two or three figures which would give an indication of the grade of color of the product being tested. While certain of these apparatus might be employed to carry out my method by special adaptation, to my knowledge such apparatus are not normally used to measure lightness in color grading and have not employed my method.

In accordance with my discovery, a satisfactory commercial color grading of some classes of products using lightness as a measure of the color grade can be obtained with a direct reading instrument and utilizing a photoelectric response to reflectance of the product being graded at a single spectrum line, or two closely adjacent lines in the same color region of the spectrum. In addition, the reading of the milliammeter or other instrument responsive to the photoelectric cell is made with reference to two selected known samples which fall toward opposite ends of the color range of the article to be graded, to in effect anchor the limits of reading of the instrument, and obtain a substantially full scale reading for the zone in which measurements are to be made, irrespective of the effective color width of the zone. The instrument is then set for reading from zero to one hundred from the dark to the light and provides a highly sensitive measurement which spreads the difference to be measured over the entire reading scale of the instrument. This color grading is also performed in a continuous manner by by-passing samples from a flow of the article being graded and passing them through the color grading instrument.

In accordance with my invention, the illumination source is preferably of the gas discharge tube type. This illumination is caused to strike the product to be graded at a grazing incidence so that no specular reflectance will be received by the instrument. Then either one or two lines of the diffuse reflectance are isolated from the light reflected from the product and directed to a photocell arrangement connected to an amplifying circuit. A direct reading of the color grade of the product is obtained from the milliammeter which is connected to the output of the amplifier. Alternatively the light can be subjected to filtering to isolate the desired line or lines before it falls on the object being color graded.

Color grading instruments manufactured in accordance with this invention give reproducible results in color measurements because monochromatic reflectance comparisons are made. Reproducible results are obtained even though the spectral sensitivity of commercially available photoelectric cells varies widely and the spectral transmittance of glass filters also varies. This invention employs a truly monochromatic light since the band width of the light used to generate the signal is confined to the selected line or lines generated by the light source. It is therefore possible to make the characteristics of the light source, a light-sensitive photoelectric cell and filter of each instrument match in any given monochromatic region simply by adjusting the sensitivity of the amplifier. It is, of course, necessary that the amplification characteristics of the amplifier be linear in order that all instruments produced in accordance with this invention read alike under any given set of conditions.

In this invention means is also provided to compensate in the amplifier for changes in brightness of the light source of the color grading instrument. In order to minimize the effects of temperature variations upon the light source of this instrument, the housing therefor is wrapped in heat insulating material such as glass wool or fiber glass. These precautions, namely, providing compensation in the amplifier for temperature changes in the light generating device which affect the lightness of the light generated and providing heat insulation for the light housing, facilitates among other things in keeping the zero calibration of the indicating instrument fixed once it is set. Also the instrument can be calibrated so that differences in color shade which are hardly perceptible to the human eye can be spread out over substantial parts of the scale of the meter.

The above and other objects of the invention are obtained as described in connection with a preferred embodiment of the invention, with reference to the accompanying drawings, in which:

FIG. 1 is a schematic view of a color grading instrument which can be employed with the present invention.

FIG. 2 is a wiring diagram.

FIG. 3 is a schematic view of a color grading instrument for use with a continuous reading of a sample taken from a flow of the material being graded.

FIG. 4 shows graphs illustrating range of variations in response of light-sensitive or photoelectric cells of a given type and it also shows variation of light intensity produced by a conventional incandescent lamp type light source at different filament temperatures; the band width of a green filter in relation to the other graphs is also shown.

FIG. 5 is a graph used to illustrate the range of response characteristics of a light-sensitive cell of commercial type shown in relation with a narrow band pass green filter and the 546 millimicron line of mercury.

Referring to FIG. 1, a color grading instrument of the general character disclosed in my copending application Serial No. 289,717 now Patent No. 3,016,788 issued Jan. 16, 1962, is shown, and reference is made thereto for details not described herein. With reference to FIGURE 1, a tubular light source 10 is provided in a compartment 11 inside of the casing 12 and this gas discharge tube or light source may be of conventional form and supplied with a conventional source of lighting voltage as described hereinafter. From this source of light, which contains lines in the same general color region of the spectrum, reflected light is transmitted at a grazing incidence angle through a transparent plate 13, to a sample 19 in a beaker or other suitable receptacle seated in a well 15. Diffuse reflected light from the sample is directed downwardly through a tubular shield 17 and through a filter 18 which passes only one or two lines in the color spectrum to allow them to impinge upon a photocell 14. With some materials a filter of narrow band width of not over 54 millimicron can be employed as is illustrated in curve G, FIG. 5. The photocell or phototube 14 is electrically connected, as later described, to a suitable meter 63 whose reading gives a direct indication of the color grade of the sample being used.

In FIG. 4 there is shown two curves A and B which illustrate how the characteristics of commercially available protoelectric cells may vary. Curves C and D show how the light output of conventional incandescent lamps varies depending upon the temperature of the filament thereof which is influenced by the voltage applied thereto. These curves are related to the green filter curve E. From curves A and B it is seen that commercially available photoelectric cells may vary considerably in their light response characteristics, and from curves C and D it is seen that the intensity of the light output of the incandescent lamp, when operated at different voltages varies considerably in the region between approximately 500 millimicrons and 600 millimicrons embraced by the curve of the green filter, as shown by curve E. The graphs shown in FIG. 5 illustrate the conditions that are obtained in applicant's invention in which a narrow band pass green filter having the characteristic shown by the curve G is employed for the purpose of selecting only the green 546 millimircon line of mercury band F. With this arrangement it is possible to obtain instruments giving reproducible results even though light-sensitive cells, varying in response characteristics between the limits shown by curves A and B are employed, and this may be obtained simply by adjusting the gain control of the linear response amplifier. Curves similar to those shown in FIG. 5 may be obtained by using the different spectrum lines selected in accordance with this invention, as will be described hereinafter.

In one form of instrument for color grading raw or processed tomato juice or pulp, malt, cereal products such as cornflakes, bran flakes, rice flakes, etc., capsicum spices and orange juice and pulp products, the light source is a conventional mercury vapor tube, which includes persistent spectrum lines at 404.1, 435.8, and 546.1 millimicrons and other minor lines, the glass filter 18 isolating the 546.1 millimicron green line of mercury.

In another example of the invention the instrument is equipped with a neon light source of a conventional type, and the filter 18 employed is of a type to pass predominantly the 640.2 millimicron red line of neon, the filter also passing such other lines as 650.6 and 659.9 which are farther into the red region of the spectrum but are of less intensity than the 640.2 line. Using the neon light source, a phototube is employed which cuts off very rapidly in the red region so that the instrument is less sensitive to the 650.6 line and the 659.9 lines and substantially monochromatic light predominantly from the 640.2 line is present. This arrangement of parts has been used successively in the grading of ground coffee, and also some cereal prducts such as cornflakes and rice flakes, etc. In another type of application the 435.8 blue line of mercury and a blue filter can be used for color grading toasted products such as cookies and crackers for example.

In another application of the invention using a neon light source, a light filter is employed which predominantly passes the 650.6 and 659.9 lines of neon and is used in connection with lemons to detect the greenness of the lemons, due to the presence of chlorophyll. Chlorophyll has an absorption peak at 675 millimicrons and the 650.6 and 659.9 lines of neon give a very satisfactory response to this greenness in lemons.

The housing for the light generating tube 10 and the light sensitive cell 14 is supported from the top panel 22 by means of the members 21 which are attached thereto by suitable screws. This housing is substantially entirely surrounded by the heat insulating material 20 which may be fiber glass or glass wool, or similar heat insulating material. Thus only the well 15 of the apparatus is left open and is not covered by the heat insulating layer. The purpose of this insulation is to prevent rapid heat fluctuations from affecting the light generating tube 10 so as to eliminate rapid changes in brightness of the light generated. A thermistor 48, which is positioned on the light generating tube 10, as shown in FIG. 1, is connected to the amplifier circuit shown in FIG. 2 and this thermistor provides for compensation in the amplifier in changes in brightness of the light generating source due to changes in temperature thereof. The thermistor has a negative resistance-temperature co-efficient so that as its temperature increases, its resistance decreases. For example, in the temperature operating range from 100° F. to 130° F., the resistance of the thermistor 48 used in conjunction with a blue mercury vapor lamp was chosen to decrease from 3000 ohms to slightly less than 1000 ohms. Thermistors having various characteristics can be produced readily depending on the resistance ranges desired and the foregoing figures are given only by way of example since thermistors of other characteristics may be desired with light generating devices having other charactetristics than those here illustrated.

Referring to FIG. 3, the instrument shown in FIG. 1 is disclosed again having incorporated therein a transparent container 131 divided into two communicating compartments by a depending partition 134, an inlet pipe 136 is connected to the container 131 and is also connected to a pump 137 which draws a sample of the product from a suitable conduit 138 in the production line. The discharge conduit 141 is connected to the discharge side of the container 131 and returns the sample to conduit 138. Thus a circulating flow of any juice or liquid product can be affected through the color grading instrument and a continuous reading effected of the color so as to continuously afford opportunities to control the desired color in the production line.

In accordance with the instant invention, the amplifier circuit which operates in response to light falling on the cell 14 incorporates components which, by a null method, enables setting a milliammeter calibrated, say from zero to 100, to read zero with respect to a predetermined color standard below the darkest color of the particular porduct being graded. After this setting or adjusting of the lower end of the scale, in effect an anchoring of this lower end of the scale of a milliammeter, the upper limit reading of the milliammeter can be adjusted by placing another color standard of a predetermined lighter color with reference to the color of the particular product being graded and the circuit components adjusted to give a reading of say 50, 70, or 100. Thereafter when a product to be color graded is placed in the instrument, a direct reading of its particular color grade which is indexed to the two color standards can be obtained on the scale of the milliammeter.

Referring to FIG. 2, an A.C. amplifier is shown which is conventional in all particulars not described in detail. The circuit generally includes a light sensitive means, shown as one phototube 14, having as a source of voltage a suitable battery 31. The phototube 14 may be of the type 926 with S-3 spectral response as defined on pages 2-95 to 2-98 of Industrial Electronics Handbook by William D. Cockrell, Editor, first edition 1958, McGraw-Hill Book Company, Inc. The cathode 32 of the photocell 14 is connected to the grid 33 of a tube 34 which is connected as a cathode follower type, and the tube 34 may be of the type known commercially in the trade as a 604.

The cathode 36 of the tube 34 is connected through a capacitor 37 to the grid 38 of a conventional type amplifier tube 39 of the 6BH6 type having a conventional circuit arrangement of resistors and condensers for an A.C. amplifier.

The plate 41 of the tube 39 is connected through a capacitor 42 with the grid 43 in the first half of a tube 44 of the type 12AU7, the first half of the tube 44 being used as an amplifier stage, and the second stage including a cathode 46 being connected as a cathode follower output. Associated with the cathode output of the tube 44 is a potentiometer 47 which serves as the gain control of the amplifier circuit.

The thermistor 48 which is positioned next to the light generating tube 10 as shown in FIG. 1 is connected between the cathode 46 of the second half of dual triode tube 44 and the upper terminal of the gain control potentiometer 47. This thermistor has a negative temperature resistance characteristic as previously mentioned and consequently the resistance thereof decreases as its temperature increases. Thus, the positive potential of the cathode 46 is decreased with increase in temperature of thermistor 48, since the resistance of this temperature sensitive resistor decreases as its temperature increases, and consequently the voltage drop across it will also decrease, thereby serving to bring the potential of the cathode 46 nearer to the potential of the grounded line which is connected to the negative terminal of the anode current supply source.

The adjustable contact of the potentiometer 47 is connected through a capacitor 51 to the grid 52 of a first stage amplifier of a two stage tube 52, which is also of the 12AU7 type. The second stage of the tube 53 is connected as a detector and the output from the cathode 54 thereof is connected to the grid 56 of the first stage of a two stage tube 57, which is also of the 12AU7 type.

The tube 57 is used as a bridge in which both of the outputs from the cathodes 58 and 59 have potentiometers 61 and 62 respectively interposed therein, the potentiometer 62 having its movable contact connected to the grid 64 of the second stage of the tube 57.

As will be apparent later from the description of the operation, the potentiometer 62 is employed to obtain by a null method a zero reading of the ammeter 63 for a given gain setting of the potentiometer 47, and thereafter the potentiometer 61 is utilized to standardize or set the upper anchor on the ammeter reading to the desired color grading with a given standard color reference element exposed to the light sensitive means 14.

In the operation of grading the color, and calibrating the instrument for grading the color, of a given product, with a color standard in viewing position, which is below the range of any color grading to be read, the instrument is set to a desired gain by adjustment of the potentiometer 47 so that a normal scale reading is obtained, and then the bucking circuit controlled by the potentiometer 62 is adjusted so that a zero reading or null balance is obtained for the sample being viewed. Thereafter a reference standard of color, which might be above any samples to be graded, is placed in the machine and then the potentiometer 61 is adjusted to bring the scale reading of the milliammeter 63 to a desired upper limit or anchor say at the reading 100. In this way the instrument has been calibrated so that a desired range of color readings with respect to the particular sample of product being employed is provided over the entire scale from zero through 100 and a maximum reading for a given color difference can be read on the scale of any color change. The lighter standard used of the two reference standards may be slightly darker than the lightest product to be graded and by setting the upper limit or anchor at a lower reading on the scale, say 70 or 80, the actual "color" number of a food product being graded can be read up scale with sufficient accuracy.

This method in effect amplifies a small range of color difference over the entire (zero to 100) scale of the instrument enabling color measurements of precision irrespective of the amount of variation of color in the products to be graded. Measurements made in comparison to two known permanently colored surfaces, for example polystyrene surfaces, at or adjacent opposite ends or limits of the range of color to be graded, enables numerical location or positioning of the unknown sample between the known reference colors. The reference standards may also be made from suitable painted surfaces, also the color of the reference standards need not conform in all cases to the color of the product. For example, malts can be graded as to lightness by employing green reference standards and the predominant 546 line of mercury. This method is applicable to all types of color grading where the change in color tends to follow a natural law. For example, as corn flakes are toasted to a greater degree, they always become a darker brown in color, they never change their character of color. Also, the color changes during fruit ripening are another example.

With reference to the grading of tomato pulp for example, the diffuse spectral reflectance curves of tomatoes all show a little plateau area from about 545 millimicrons to about 560 millimicrons which is just ahead of the rapid increase in reflectance which gives a tomato its red color, and this plateau area is in the region of green reflectance. The higher this plateau is, the greater the proportion of green reflectance mixed with the red. This plateau area also contains adjacent its center the 555 millimicron line which is the peak sensitivity of the average eye with daylight adaptation and provides a region of critical characteristics in measuring color of tomatoes. In the color measurement of tomato pulp, therefore, it is only necessary to anchor the limits of the instrument around this plateau area and employ a green light to measure the changes in color, the actual measurement being made as pointed out above at the 546 millimicron line.

While I have shown and described a preferred embodiment of the invention, it is apparent that the invention is capable of variation and modification from the form shown so that the scope thereof should be limited only by the scope of the claims appended hereto.

What I claim is:

1. In color grading apparatus the combination of an electric discharge device comprising an elongated vitreous tube having an atmosphere of rarified gas, said tube being of substantially circular shape, a housing having a cavity for said tube, heat insulating material positioned on the outside of said housing and coving the sides and bottom of said housing, a substantially circular wall structure in said cavity surrounded by said electric discharge device, light filter means positioned in said wall structure for selecting substantially monochromatic lines from the light produced by said electric discharge device, wall structure in the top of said housing defining a well into which the sample to be color graded is inserted, the bottom of said well being open so that light produced by said electric discharge device impinges said sample and is reflected from said sample into said filter means, a light sensitive cell positioned under said filter means to receive light reflected from said sample and passing through said filter means, and an indicating device connected to said light sensitive cell for indicating the magnitude of light energization of said cell.

2. In color grading apparatus the combination of an electrically energized light generating device for illuminating a sample being color graded, said device comprising an elongated vitreous tube having means for making electrical connections thereto, a light sensitive cell positioned to receive light reflected from the sample being color graded, an amplifier comprising a plurality of stages having the input circuit thereof connected to said light sensitive cell, an indicating device, a bridge circuit having one leg thereof connected to the output of said amplifier, means including a variable resistor for connecting said indicating device across said bridge circuit, said bridge circuit comprising four legs, two of which comprise a dual triode and the other two of which each comprise a resistor, one of which is variable for setting the zero of said indicating device, temperature sensitive resistor means having a negative resistance-temperature coefficient connected to said amplifier to vary the gain thereof, said resistor means being positioned adjacent to said light generating device so that the gain of said amplifier is varied to compensate for variation in light output of said generating device caused by temperature variation thereof.

3. In color grading apparatus the combination of an electrically energized light generating device for illuminating a sample being color graded, said device comprising an elongated vitreous tube having means for making electrical connections thereto, a light sensitive cell positioned to receive light reflected from the sample being color graded, an amplifier comprising a plurality of stages having the input circuit thereof connected to said light sensitive cell, an indicating device connected to the output of said amplifier, temperature sensitive resistor means having a negative resistance-temperature coefficient connected to said amplifier to vary the gain thereof, said resistor means being positioned adjacent to said light generating device so that the gain of said amplifier is varied as the temperature of said light generating device varies to compensate for variations in light output of said generating device caused by variations in temperature thereof.

4. In color grading apparatus the combination of an electrically energized light generating device for illuminating a sample being color graded, said device comprising an elongated vitreous tube having means for making electrical connections thereto, a light sensitive cell positioned to receive light reflected from the sample being color graded, an amplifier comprising a plurality of stages having the input circuit thereof connected to said light sensitive cell, said amplifier also having a manually adjustable gain control, an indicating device connected to the output of said amplifier, temperature sensitive resistor means having a negative resistance-temperature coefficient connected to said amplifier in series with said manually adjustable gain control for automatically varying the gain of said amplifier, said resistor means being positioned adjacent to said light generating device so that the gain of said amplifier is varied as the temperature of said light generating device varies to compensate for variations in light output of said generating device caused by variations in temperature thereof.

5. In color grading apparatus the combination of an electrically energized light generating device for illuminating a sample being color graded, said device comprising an elongated vitreous tube having means for making electrical connections thereto, heat insulating material positioned on the outside of said light generating device, a light sensitive cell positioned to receive light reflected from the sample being color graded, an amplifier comprising a plurality of stages having the input circuit thereof connected to said light sensitive cell, an indicating device connected to the output of said amplifier, temperature sensitive resistor means having a negative resistance-temperature coefficient connected to said amplifier to vary the gain thereof, said resistor means being positioned adjacent to said light generating device so that the gain of said amplifier is varied as the temperature of said light generating device varies to compensate for variations in light output of said generating device caused by variations in temperature thereof.

6. In color grading apparatus the combination of an electrically energized light generating device for illuminating a sample being color graded, said device comprising an elongated vitreous tube having means for making electrical connections thereto, heat insulating material positioned on the outside of said light generating device, a light sensitive cell positioned to receive light reflected from the sample being color graded, an amplifier comprising a plurality of stages having the input circuit thereof connected to said light sensitive cell, said amplifier also having a manually adjustable gain control, an indicating device connected to the output of said amplifier, temperature sensitive resistor means having a negative resistance-temperature coefficient connected to said amplifier in series with said manually adjustable gain control for automatically varying the gain of said amplifier, said resistor means being positioned adjacent to said light generating device so that the gain of said amplifier is varied as the temperature of said light generating device varies to compensate for variations in light output of said generating device caused by variations in temperature thereof.

7. In color grading apparatus the combination of an electric discharge device comprising an elongated vitreous tube having an atmosphere of rarified gas, said tube being of substantially circular shape, a housing having a cavity for said tube, heat insulating material positioned on the outside of said housing and covering the sides and bottom of said housing, a substantially circular wall structure in said cavity surrounded by said electric discharge device, light filter means positioned in said wall structure for selecting substantially monochromatic lines from the light produced by said electric discharge device, wall structure in the top of said housing defining a well into which the sample to be color graded is inserted, the bottom of said well being open so that light produced by said electric discharge device impinges said sample and is reflected from said sample into said filter means, a light sensitive cell positioned under said filter means to receive light reflected from said sample and passing through said filter means, an amplifier comprising a plurality of stages having the input circuit thereof connected to said light sensitive cell, said amplifier also having a manually adjustable gain control, an indicating device connected to the output of said amplifier, temperature sensitive resistor means having a negative resistance-temperature coefficient connected to said amplifier in series with said manually adjustable gain control for automatically varying the gain of said amplifier, said resistor means being positioned adjacent to said light generating device so that the gain of said amplifier is varied as the temperature of said light generating device varies to compensate for variations in light output of said generating device caused by variations in temperature thereof.

References Cited by the Examiner

UNITED STATES PATENTS

| 1,894,808 | 1/1933 | Whitte. | |
| 2,273,356 | 2/1942 | Holven et al. | 88—14 |
| 2,329,584 | 9/1943 | Bourne | 315—117 X |
| 2,428,806 | 10/1947 | Liben et al. | 88—14 X |
| 2,785,316 | 3/1957 | Kingsbury | 88—23 |
| 2,839,646 | 6/1958 | Hester. | |
| 2,868,995 | 1/1959 | Kelsey et al. | |
| 2,928,310 | 3/1960 | Christie | 88—14 |
| 2,939,361 | 6/1960 | Hock | 88—14 |
| 2,978,951 | 4/1961 | Christie | 88—14 |
| 3,020,793 | 2/1962 | Neubrech et al. | 88—14 |
| 3,031,917 | 5/1962 | Pelavin | 88—14 |
| 3,122,635 | 2/1964 | Ludlum | 88—14 X |

OTHER REFERENCES

Smith et al., Tomato Classification by Spectrophotometry, Electronics, vol. 25, No. 1, January 1952, pp. 92–94.

JEWELL H. PEDERSEN, *Primary Examiner.*

T. L. HUDSON, *Assistant Examiner.*